(12) United States Patent
Katsuda et al.

(10) Patent No.: US 7,086,774 B2
(45) Date of Patent: Aug. 8, 2006

(54) SURFACE LIGHTING DEVICE AND LIQUID CRYSTAL DISPLAY DEVICE USING THE SAME

(75) Inventors: Yasutoshi Katsuda, Mie (JP); Takeshi Ogura, Mie (JP); Satoshi Ono, Mie (JP)

(73) Assignee: Sharp Kabushiki Kaisha, Osaka (JP)

( * ) Notice: Subject to any disclaimer, the term of this patent is extended or adjusted under 35 U.S.C. 154(b) by 196 days.

(21) Appl. No.: 10/761,273

(22) Filed: Jan. 22, 2004

(65) Prior Publication Data

US 2004/0150981 A1 Aug. 5, 2004

(30) Foreign Application Priority Data

Jan. 24, 2003 (JP) .......................... P2003-016746
Dec. 16, 2003 (JP) .......................... P2003-418551

(51) Int. Cl.
*F21V 15/00* (2006.01)
(52) U.S. Cl. .................. 362/634; 362/614; 362/561
(58) Field of Classification Search ............... 362/614, 362/632, 633, 634, 561; 349/58, 60
See application file for complete search history.

(56) References Cited

U.S. PATENT DOCUMENTS 5,211,464 A * 5/1993 Bohmer .................. 362/634
6,108,060 A * 8/2000 Funamoto et al. ............ 349/65
6,512,557 B1    1/2003 Miwa
6,545,732 B1 * 4/2003 Nakano ....................... 349/58
6,808,302 B1 * 10/2004 Miyamoto ................... 362/580

FOREIGN PATENT DOCUMENTS

| JP | 6-76936 U | 10/1994 |
|---|---|---|
| JP | 2000-331521 A | 11/2000 |
| JP | 2001-108988 A | 4/2001 |
| KR | 2002-0015107 | 2/2002 |

* cited by examiner

*Primary Examiner*—Stephen Husar
*Assistant Examiner*—Peggy A. Neils
(74) *Attorney, Agent, or Firm*—Birch, Stewart, Kolasch & Birch, LLP

(57) ABSTRACT

A backlight unit of a liquid crystal display device includes a prism light guide plate supported by a frame-like chassis. The light guide plate includes a light incident surface having two ends, near which stainless steel metal stoppers are attached respectively. The metal stoppers include pawls which, upon the attachment, come inward from sides of the light incident surface of the light guide plate to between the light incident surface and a lamp (lamp holders). When the liquid crystal display device is subjected to an impact from outside, the metal stoppers prevent the light guide plate from moving toward the lamp, thereby offering improved impact resistance.

20 Claims, 13 Drawing Sheets

11Ap

11Bp

12Ap

12Bp

 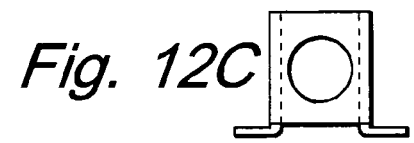 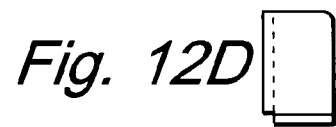
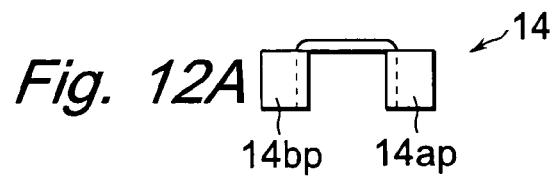

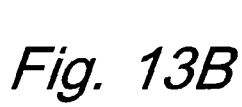
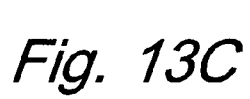
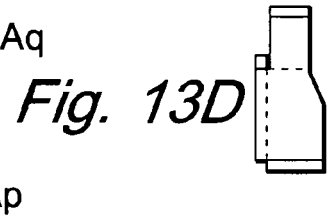
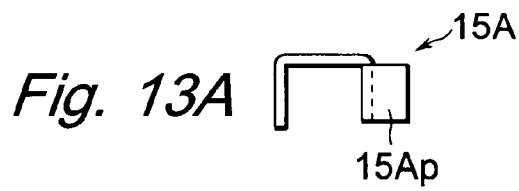
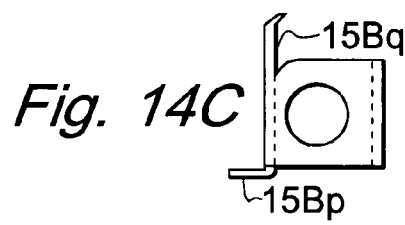
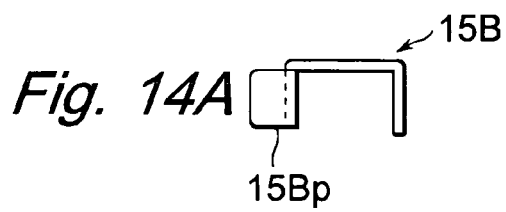

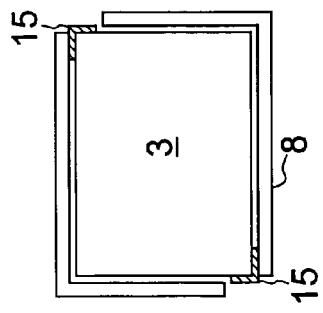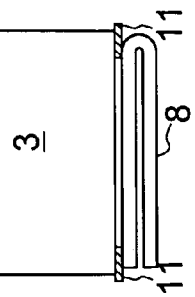
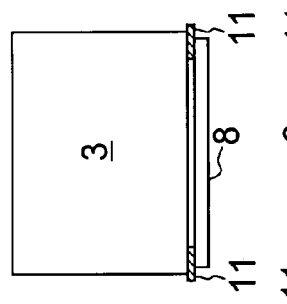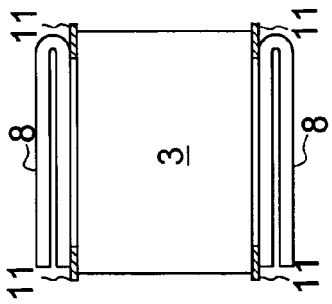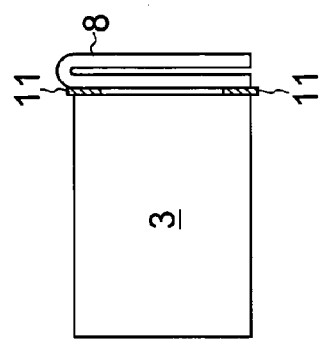
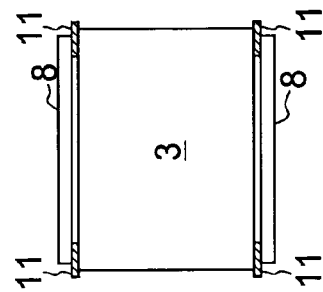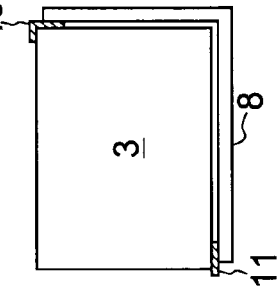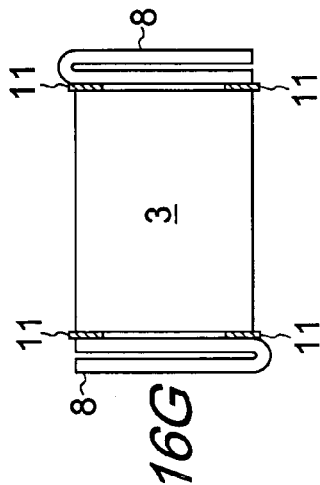
Fig. 16A  Fig. 16B  Fig. 16C
Fig. 16D  Fig. 16E  Fig. 16F
Fig. 16G  Fig. 16H  Fig. 16I

SURFACE LIGHTING DEVICE AND LIQUID CRYSTAL DISPLAY DEVICE USING THE SAME

CROSS REFERENCE TO RELATED APPLICATIONS

This application claims priority under 35 U.S.C. §119(a) on Patent Applications No. 2003-016746 filed in Japan on Jan. 24, 2003 and No. 2003-418551 filed in Japan on Dec. 16, 2003, the entire contents of which are hereby incorporated by reference.

BACKGROUND OF THE INVENTION

1. Field of the Invention

The present invention relates to sidelight-type surface lighting devices which use a light guide member having a side surface for reception of light from the light source. The present invention also relates to liquid crystal display devices which use such a surface lighting device serving as lighting means in the form of a backlight unit for example.

2. Background Art

Liquid crystal display devices have been finding expanding fields of application due to advantages including low power consumption, light-weight and thinness. Liquid crystal display devices are now commonly used as residential/commercial image monitors, industrial monitoring devices, and display devices for mobile communications terminals. These liquid crystal display devices are often provided with a backlight unit or a surface lighting device since liquid crystals do not illuminate by themselves and providing light from behind the liquid crystal panel is often preferred.

Most of the backlight units used in the liquid crystal display devices are sidelight type so that the whole device can be as thin as possible. Typically, the sidelight-type backlight includes a tubular light source called edge light, which is a cold cathode tube placed on a side surface of a light guide plate. Light from the edge light enters the light guide plate from the side surface, and then comes out from the upper surface or main surface, illuminating the back surface of the liquid crystal panel. Thus, the backlight unit serves as a surface lighting device which provides lighting from behind the liquid crystal panel.

In response to increasing requirement for reduction in the number of parts, decrease in thickness and increase in brightness, use of prism light guide plates is increasing in liquid crystal display devices for large-sized, notebook-type personal computers.

FIG. 18 is a sectional view of a conventional liquid crystal display module (hereinafter called Conventional Example 1) used in notebook PCs (notebook-type personal computers). This liquid crystal display module 200 includes a metal bezel 202 formed typically by press. The bezel 202 serves as a frame, to which a resin chassis 207 is fitted as a supporting member. A main body of the liquid crystal display module 200 includes two components: a liquid crystal panel 211 which includes a liquid crystal layer and two glass substrates sandwiching the liquid crystal layer; and a backlight unit 212 serving as a surface lighting device. The main body is supported or held by the chassis 207 and housed in the frame. The backlight unit 212 includes a prism light guide plate 203 supported by the chassis 207, an optical sheet 205 and a protective sheet 206 placed one after the other on an upper surface of the prism light guide plate 203, and a reflective plate 204 placed on a lower surface of the prism light guide plate 203. The backlight unit 212 further includes: an edge light (hereinafter simply "lamp") 208, which is a single-tube, cold-cathode tube placed closely to a side surface of the prism light guide plate 203; a stainless-steel lamp reflector 209 which reflects the light from the lamp 208; and lamp holders 210 which hold the lamp 208. The lamp reflector 209 covers all side surfaces of the lamp 208 except one facing the prism light guide plate 203, allowing light from the lamp 208 to enter the side surface of the prism light guide plate 203. The light that enters from this side surface (hereinafter called "light incident surface") serves as illumination light, i.e. comes out of an upper surface or the main surface of the prism light guide plate 203, and thereby provides lighting from behind the liquid crystal panel 211.

FIG. 19 is a plan view of a backlight unit in another conventional liquid crystal display module (hereinafter called Conventional Example 2: See the U.S. Pat. No. 6,512,557 which corresponds to the Japanese Patent Laid-Open 2001-108988.) In this Conventional Example, a light guide plate 303 includes projections 303a, 303b which are fitted into a frame 307, thereby fixing and positioning the light guide plate 303 with respect to the frame 307.

However, such projections as the above cannot be provided on the light guide plate if the backlight unit uses a prism light guide plate as in Conventional Example 1, in view of maintaining uniform brightness required of the surface lighting device. With the limitation that the fixing means based on such projections cannot be used, there must be some other means for securing the light guide plate. In an attempt to solve this problem, there has been made a proposal that a position-shift prevention mechanism be provided on the light incident surface of the light guide plate, i.e. on the surface facing the edge light or the cathode tube. The proposal is applicable if the lamp reflector is made of PET (polyethylene terephthalate) resin or other elastic materials. However, if the material is not elastic as in Conventional Example 1 which uses a stainless-steel lamp reflector 209, it becomes difficult to assemble the lamp reflector into place. As a result, it becomes difficult to provide the stopping means on the lamp housing (frame).

Thus, in the case represented by Conventional Example 1 where the backlight unit uses a prism light guide plate and a rigid lamp reflector made of e.g. stainless steel for improved efficiency in the use of light, it is impossible to realize a positioning mechanism by providing stopping means on the lamp housing (frame). Under this limitation, the lamp holders 210 are supposed to serve as a positioning mechanism for the light guide plate, and this poses a problem of reduced impact resistance especially in large-sized liquid crystal display modules.

In an attempt to solve this, the Japanese Patent Laid-Open 2000-331521 discloses a sidelight-type surface lighting device (and liquid crystal display devices using the same), in which a light guide plate includes a light entering surface (light incident surface) having two ends each provided with a position-shift prevention mechanism. The mechanisms are located where the light incident surface is faced by electrodes of a stick-like light source serving as an edge light.

According to this surface lighting device, the position-shift preventing mechanism is provided by a projection projected from an inner wall surface of a frame that holds the light guide plate, or as part of a metal reinforcing member for the frame that holds the light guide plate.

A problem here is that it is difficult to give these projections a sufficient thickness when the position-shift prevention mechanism is to be a projection from a resin frame, in view of making the frame width as narrow as possible.

Further, there is a problem related to assembling, i.e. it is almost impossible to attach a lamp and a lamp reflector to a resin frame.

On the other hand, if the position-shift prevention mechanism is to be part of the reinforcing metal member, there is a problem of impact resistance, because the mechanism will usually be formed by cutting and removing a portion of the metal member. The cutting sacrifices strength since the metal material generally used for the lamp reflector is only as thick as 0.188 mm. If the metal thickness is increased, the resultant thickness of the module will have to be 6.5 mm or over, which will reduce merchantability of the liquid crystal display devices (liquid crystal display module). It should be appreciated that a lamp reflector surrounds the lamp except a part close to the light incident surface of the light guide plate. For this reason, a 0.5 mm addition to the thickness of lamp reflector metal plate will cause a total thickness addition of: 0.5 mm×2=1.0 mm.

Further, if the reinforcing metal member has a cutout, there is no but one way of assembling the lamp into the lamp reflector, i.e. by inserting the lamp longitudinally thereof, into the lamp reflector. This must be done carefully enough so that the lamp is not damaged, leading to reduced operability in the assembling process. For the same reason, it is not easy to replace the lamp, either.

Thus, according to the disclosure in the Japanese Patent Laid-Open 2000-331521, the position-shift prevention mechanism will not have a high strength, or the reinforcing metal member will have a reduced strength. Therefore, it is impossible to achieve sufficient impact resistance without sacrificing a desired narrowness in the frame of the display device.

SUMMARY OF THE INVENTION

It is therefore a feature of the present invention to provide a surface lighting device such as a backlight unit, capable of offering a high impact resistance without sacrificing a desired narrowness in the frame of the display device, under conditions where a prism light guide plate and/or a stainless-steel lamp reflector are used.

Another feature of the present invention is to provide a liquid crystal display device using such a surface lighting device.

A first aspect of the present invention provides a surface lighting device comprising:

a light guide member having a side surface for light to enter, and a main surface for the light to exit;

a light source facing at least one side surface of the light guide member;

a holder for holding the light guide member; and a stopper near a light incident surface which is the side surface faced by the light source, for preventing the light guide member from moving toward the light source;

wherein the stopper is a separate member attached to the holder.

According to the above arrangement, the stopper is a separate member attached to the holder, and thus the stopper can be made of a thin and strong material selected from a wide range of candidates. This enables to improve impact resistance, and when the surface lighting device is used as lighting means for liquid crystal display devices, the impact resistance improvement can be rendered without sacrificing a desired narrowness in the frame of the display device. Further, when assembling the surface lighting device, the light incident surface of the light guide member is stopped at a predetermined position, making it easy to position the part and thus improve operating efficiency (productivity) in the assembling process. This also improves positioning accuracy of the light guide member, leading to improved uniformity in the quality of display due to improved uniformity in the lighting provided by the surface lighting device. Still further, since the stopper is a separate member, the stopper can be used commonly in many different surface lighting devices. This can reduce cost of the stopper while improving operability in assembling process.

In the surface lighting device, preferably, the light source is linear.

In the surface lighting device, the light source may be L-shaped, facing two mutually adjacent side surfaces of the light guide member, and the stopper prevents the light guide member from moving toward the light source for prevention of the two mutually adjacent surfaces which are the light incident surfaces from contacting the light source.

According to the above arrangement, the use of an L-shaped light source enables to increase brightness of the backlight desired as a surface lighting device, without increasing the number of light sources and therefore without increasing the number of driving circuits such as an inverter circuit for the light source. The stopper prevents the light guide member from moving toward the L-shaped light source, enabling to provide a bright backlight unit which has a high impact resistance, while avoiding undesirable cost increase.

In the surface lighting device, the light source may be U-shaped.

According to the above arrangement, use of a U-shaped light source enables to increase brightness of the backlight desired as a surface lighting device, without increasing the number of light sources and therefore without increasing the number of driving circuits such as an inverter circuit for the light source. The stopper prevents the light guide member from moving toward the U-shaped light source, enabling to provide a bright backlight unit which has a high impact resistance, while avoiding undesirable cost increase.

In the surface lighting device, the light source may include a first and a second light sources, and the stopper prevents the light guide member from moving toward the first light source and toward the second light source.

According to the above arrangement, a first and a second light sources i.e. a plurality of light sources are used, and the light guide member is prevented from moving in any of the directions toward the first and the second light sources. Thus, it becomes possible to provide a bright backlight unit which has a high impact resistance.

In the surface lighting device, preferably, the stopper is made of a material having strength to enable the prevention of the light guide member from moving toward the light source at least to such an extent that the surface lighting device is improved in impact resistance by the stopper. Such a material may be metal for example.

According to the above arrangement, impact resistance can be improved by the use of a stopper which is a separate member made of a strong material e.g. a metal, regardless of a material from which the holder is made.

In the surface lighting device, preferably, the stopper is made of a shape-memory alloy.

According to the above arrangement, the surface lighting device can restore and maintain an original level of impact resistance provided by the shape memory capability of the shape-memory alloy, even if the surface lighting device has received impact from outside for plurality of times.

In the surface lighting device, preferably, the stopper includes a surface having a reflectance not smaller than 70%.

According to the above arrangement, light is reflected at a high rate on the surface of the stopper, whereas light absorption by the stopper is reduced. Therefore, efficiency in the use of light from the light source is improved.

In the surface lighting device, preferably, the stopper includes a surface having a reflectance not smaller than 80% and facing the light guide member.

According to the above arrangement, use of the stopper which has a high reflectance on the surface facing the light guide member not only enables more efficient use of light by the surface lighting unit but also improves on a problem that corners of the main surface in the light guide member look dark. This problem can develop if the light source is provided by a linear light source having two ends, and brightness at the two ends is low.

In the surface lighting device, preferably, the stopper is attached to the holder closely to an end of the light incident surface, and includes a portion extending inward from a side of the light incident surface for contacting the light incident surface at a time of preventing the light guide member from moving toward the light source.

According to the above arrangement, the portion extending inward from a side of the light incident surface is the portion of the stopper that prevents the light guide member from moving. Therefore, use of a rigid lamp reflector such as a stainless steel lamp reflector which will improve efficiency in the use of light does not decrease operability when attaching an edge light or the light source as well as other components.

In the surface lighting device, the stopper may be provided near only one of two ends of the light incident surface.

According to the above arrangement, the stopper is provided near only one end per light incident surface which is the side surface of the light guide member faced by the light source. Therefore, it becomes possible to improve impact resistance in the surface lighting device while avoiding undesirable increase in the number of parts for the surface lighting device.

In the surface lighting device, preferably, the stopper includes a portion for contacting the light incident surface at a time of preventing the light guide member from moving toward the light source, and the portion preferably includes a through hole.

According to the above arrangement, the portion for contacting the light incident surface at a time of preventing the light guide member from moving toward the light source includes a through hole. Therefore, part of light from the light source passes through this through hole and enters the light guide from the light incident surface. Thus, the addition of the stopper does not cause unacceptable decrease in the use of light.

In the surface lighting device, preferably, the stopper includes an L-shaped portion having a first and a second sub-portions which are mutually perpendicular to each other, for two mutually adjacent side surfaces of the light guide member; both side surfaces serve as the light incident surfaces;

the first sub-portion extends inward from a side of one of the two side surfaces serving as the light incident surface, for contacting said one of the two side surfaces at a time of preventing the light guide member from moving in a direction that allows said one of the side surfaces to move toward the light source; and the second sub-portion extends inward from a side of the other of the two side surfaces serving as the light incident surface, for contacting said other of the two side surfaces at a time of preventing the light guide member from moving in a direction that allows said other of the side surfaces to move toward the light source.

According to the above arrangement where the stopper includes an L-shaped portion and two mutually adjacent side surfaces of the light guide member serve as the light incident surface, a single L-shaped stopper prevents the light guide member from moving in any of the directions which would allow any of the two light incident surfaces to move toward the light source. Therefore, it becomes possible to improve impact resistance in a surface lighting device which includes a light guide member having two mutually adjacent light incident surfaces faced by the light source while avoiding undesirable increase in the number of parts for the surface lighting device.

Another aspect of the present invention provides a liquid crystal display device including lighting means for illuminating a liquid crystal panel, wherein the lighting means is provided by the surface lighting device according to the first aspect.

According to the above arrangement, the stopper is a separate member attached to the holder, and thus the stopper can be made of a thin and strong material selected from a wide range of candidates, enabling to improve impact resistance. Therefore, impact resistance can be improved without sacrificing desired narrowness in the frame of the liquid crystal display device.

These and other objects, features, aspects and advantages of the present invention will become more apparent from the following detailed description of the present invention when taken in conjunction with the accompanying drawings.

BRIEF DESCRIPTION OF THE DRAWINGS

FIG. 12A through 12E show a metal stopper in backlight units according to a first variation of the first and the second embodiments, in front view, left side view, plan view, right side view, and rear view respectively.

FIG. 13A through 13E show a right-hand-side (RH) metal stopper in backlight units according to a second variation of the first and the second embodiments, in front view, left side view, plan view, right side view, and rear view respectively.

FIG. 14A through 14E show a left-hand-side (LH) metal stopper in the backlight units according to the above second variation, in front view, left side view, plan view, right side view, and rear view respectively.

FIG. 16A through 16I are plan-view illustrations of the variety of backlight units having different numbers and shapes of light sources, showing how metal stoppers may be disposed in each.

DESCRIPTION OF THE PREFERRED EMBODIMENTS

Hereinafter, embodiments of the present invention will be described with reference to the attached drawings.

Figure 1:
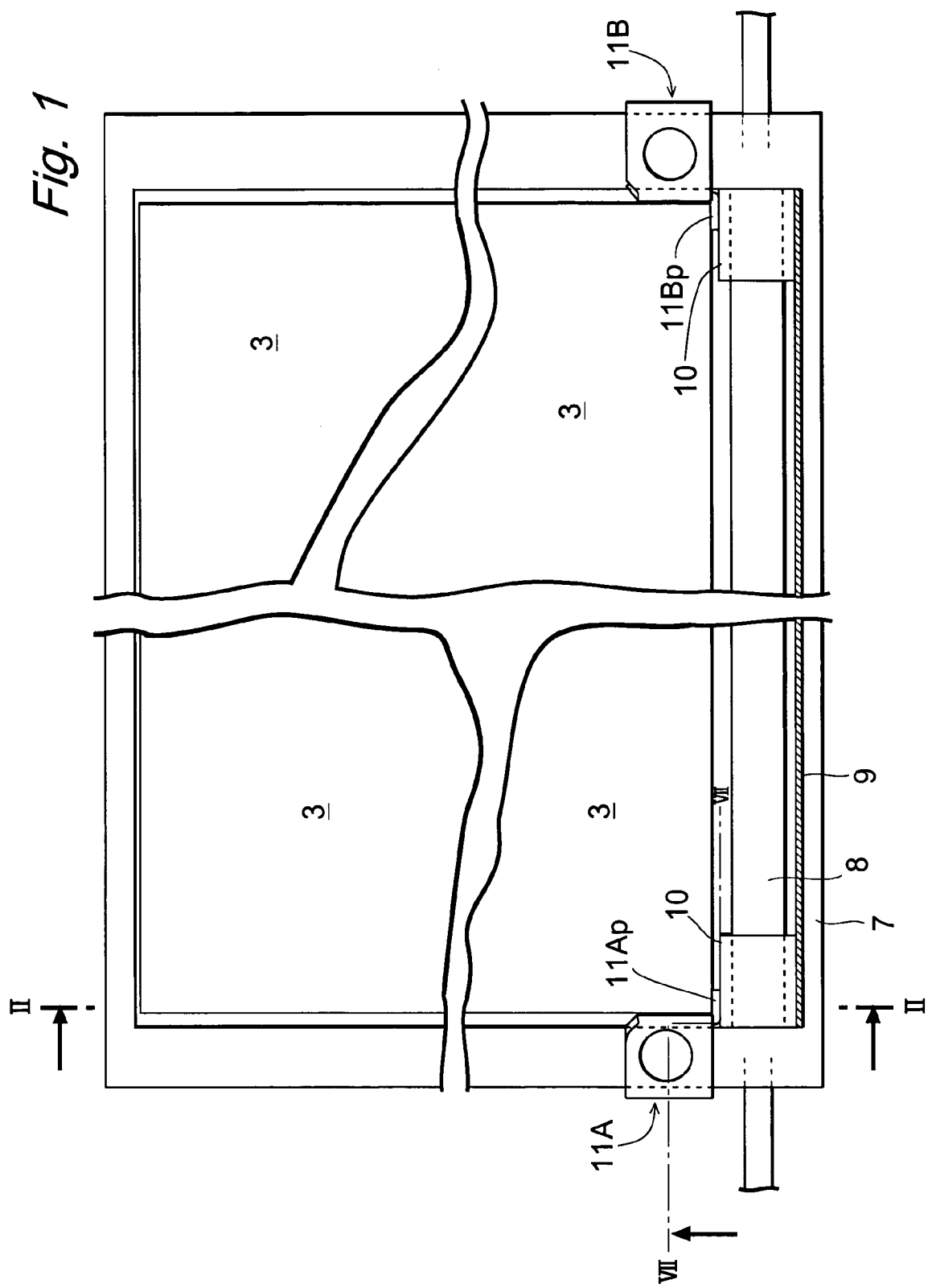
FIG. 1 is a plan view, taken from back, of a backlight unit used in a liquid crystal display device according to a first embodiment of the present invention.
Figure 2:
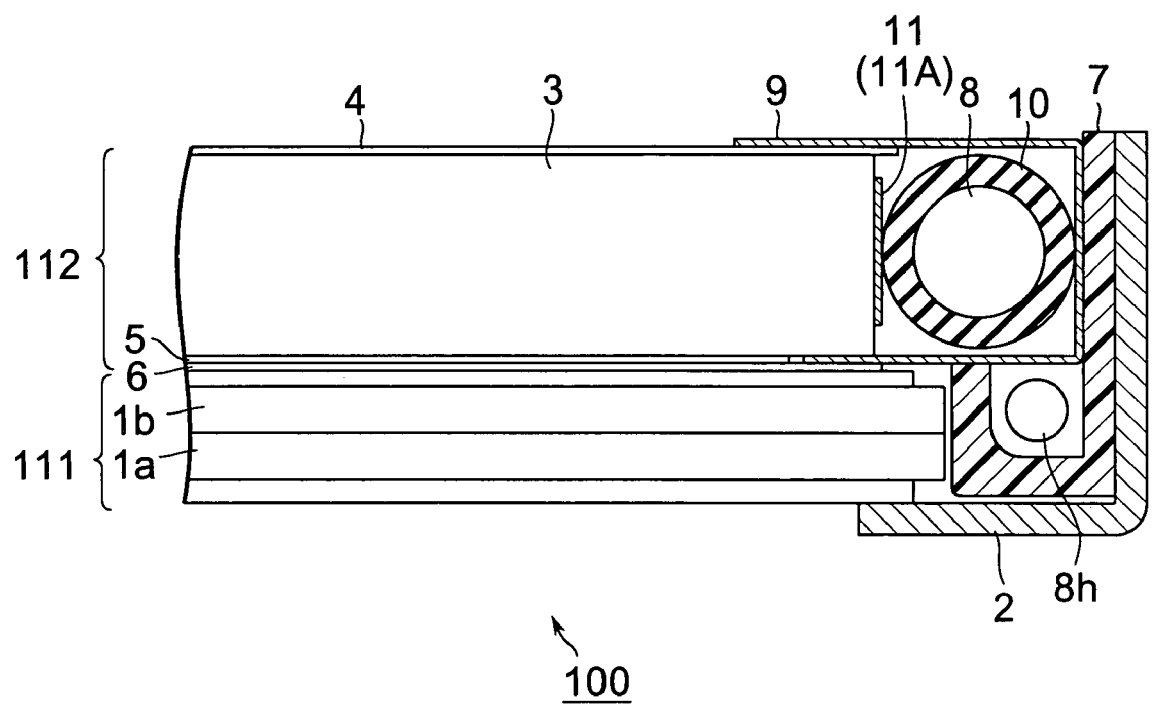
FIG. 2 is a sectional view of a primary portion of the liquid crystal display device according to the first embodiment.
Figure 18:
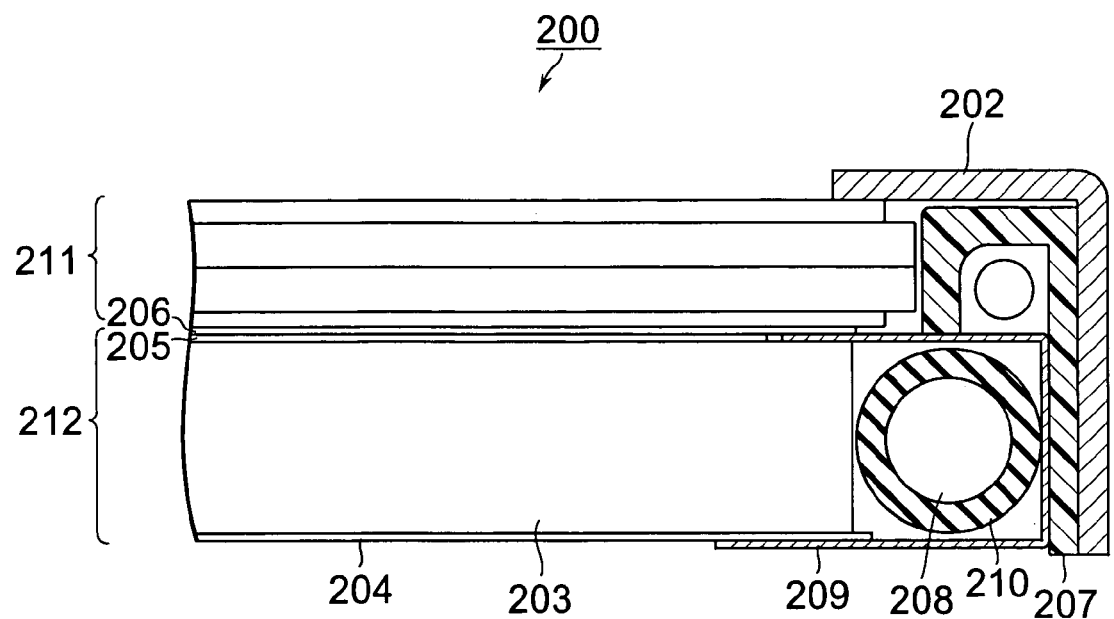
FIG. 18 is a fragmentary sectional view of Conventional Example 1, showing a primary portion of a liquid crystal display module.
Figure 19:
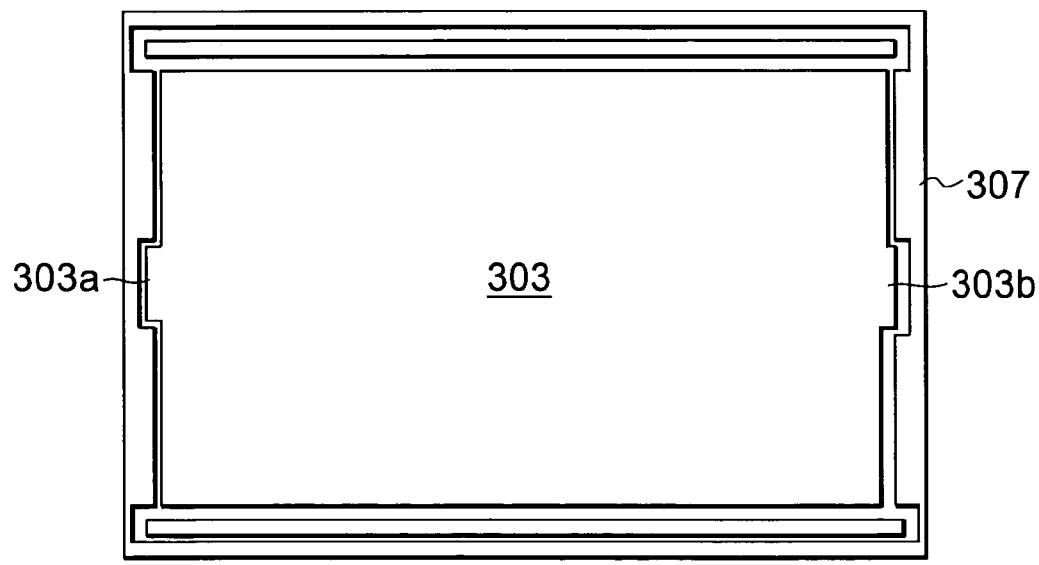
FIG. 19 is a plan view of Conventional Example 2, showing a backlight unit of a liquid crystal display module.

1. First Embodiment 1.1 Constitution A liquid crystal display device according to a first embodiment of the present invention may be used as a liquid crystal display module for a notebook PC, and includes a backlight unit serving as a surface lighting device. FIG. 1 is a rear plan view, i.e. a plan view taken from a side which faces away from a displaying surface. FIG. 2 is a sectional view, taken on lines II—II in FIG. 1, of a primary portion of a liquid crystal display device which includes a backlight unit 112 according to the present embodiment. It should be noted that in FIG. 2, the downward direction is the direction in which the displaying surface faces the viewer (where the viewer is). This directionality in FIG. 2 is upside-down of the directionality in FIG. 18 which shows Conventional Example 1. Note also, that FIG. 1 is a view toward the displaying surface or a liquid crystal panel 111 taken from a reflective plate 4 shown in FIG. 2. (Thus, FIG. 1 is called rear plan view.) For the sake of clarity, FIG. 1 does not show a bezel 2.

The liquid crystal display device according to the present embodiment is represented by a liquid crystal display module 100. Similarly to Conventional Example 1 (FIG. 18), the bezel 2, which is made of metal and is formed by press for example, provides casing for the liquid crystal display module 100. Fitted to this bezel 2 is a resin chassis 7 which serves as a support frame. A main body of this liquid crystal display module 100 includes a liquid crystal display panel 111 and a backlight unit 112, and is supported or held by the chassis 7 while being housed in the casing.

The liquid crystal display panel 111 according to the present embodiment includes a pair of transparent substrates opposed to each other or a first substrate 1a and a second substrate 1b. These substrates are spaced from each other at a predetermined distance, and the gap is filled with a liquid crystal material to form a liquid crystal layer.

The liquid crystal display panel 111 is a transparent type, and therefore, for example, each of the substrates 1a, 1b has one surface contacting the liquid crystal and the other surface (the surface which does not make contact with the liquid crystal layer) laminated with a polarizing plate. Of these surfaces, the surface of the second substrate 1b which makes contact with the liquid crystal layer is formed with a circuit which includes: a plurality of scanning line electrodes which are parallel to each other; a plurality of signal line electrodes crossing the scanning line electrodes perpendicularly; and pixel electrodes and thin film transistors (TFT) each formed in correspondence with one of the intersections between the scanning line electrodes and the signal line electrodes. The circuit may be formed of a polycrystalline silicon thin film for example. With this arrangement, each of the signal line electrodes and scanning line electrodes in the liquid crystal display panel 111 is supplied with signals necessary for displaying images, from a predetermined driving circuit (not shown).

On the other hand, the surface of the first substrate which makes contact with the liquid crystal layer has its entire surface formed with a common electrode serving as the opposed electrode, to which an appropriate voltage is given. Thus, the liquid crystal layer is applied with a voltage equal to an electric potential difference between the pixel electrode and the common electrode, and this voltage controls transmittance of the liquid crystal layer.

The backlight unit 112 according to the present embodiment has basically the same construction as Conventional Example 1 which is already discussed, and includes: a prism light guide plate 3 supported by the chassis 7; an optical sheet 5 and a protective sheet, 6 disposed in this order on the front surface of the prism light guide plate 3 (the surface facing the liquid crystal display panel 111); and a reflective plate 4 disposed on the back surface of the prism light guide plate 3 (the surface facing away from the liquid crystal display panel 111). It should be noted that the arrangement in FIG. 2, including the type and the number of optical sheet and so on, represents only one example and does not limit the present invention.

The backlight unit 112 also includes: an edge light (hereinafter simply "lamp") 8 which is a single-tube, cold-cathode tube faced to a light incident surface or one of side surfaces of the prism light guide plate 3; a stainless-steel lamp reflector 9 which reflects the light from the lamp 8; and lamp holders 10 for holding the lamp 8. The lamp holders 10 are annular rubber members which hold the lamp 8 at its end electrodes. The lamp reflector 9 covers all side surfaces of the lamp 8 except one facing the prism light guide plate 3, facilitating efficient entry of light from the lamp 8 into the light incident surface of the prism light guide plate 3. The light that enters from the light incident surface comes out of a front surface or the main surface of the prism light guide plate 3 and provides lighting from behind the liquid crystal panel 111. Thus, the backlight unit 112 works as a surface lighting device in the transparent-type liquid crystal display device like Conventional Example 1. As described earlier, transmittance of the light from behind the liquid crystal display panel 111 is controlled by the liquid crystal display panel 111, whereby images are displayed by the liquid crystal display device.

Figure 3:
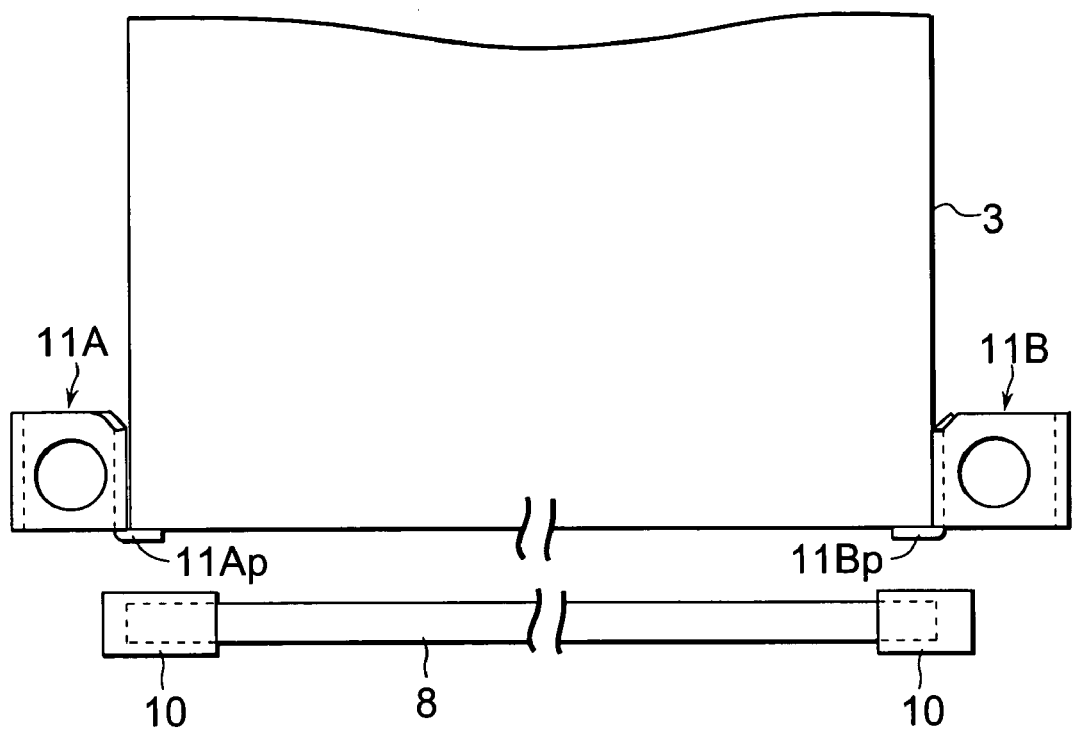
FIG. 3 is a plan view, taken from back, for describing where metal stoppers are attached in the backlight unit according to the first embodiment.
Figure 4:
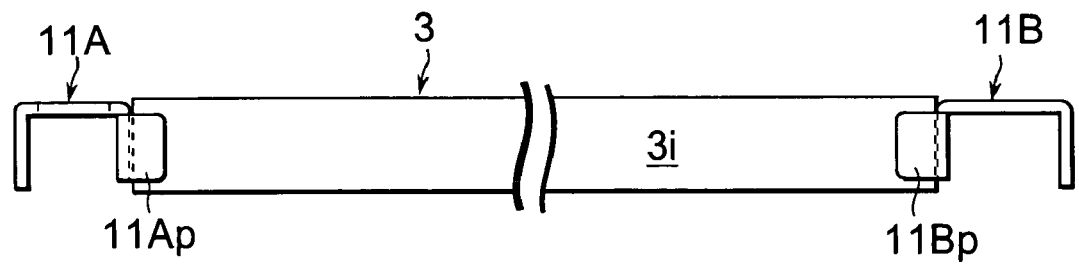
FIG. 4 is a front view (or a side view from a lamp) for describing where the metal stoppers are attached in the backlight unit according to the first embodiment.

In addition to the above, the backlight unit 112 according to the present embodiment further includes metal stoppers 11. As shown in FIG. 2, the metal stoppers 11 (or more specifically pawl portions of the metal stoppers 11 as will be detailed later) are placed between the prism light guide plate 3 and the lamp holders 10, and serve as stopping means for preventing the prism light guide plate 3 from moving toward the lamp 8. From here on, the metal stoppers 11 will be detailed with reference to FIG. 3, FIG. 4, FIGS. 5A–5E, and FIGS. 6A–6E. FIG. 3 is a rear plan view (a plan view taken from the surface away from the displaying surface), illustrating how the metal stoppers 11 are disposed in the backlight unit 112. (The distance between the light guide plate 3 and the lamp 8 is exaggerated.) FIG. 4 is a front view, i.e. a side view taken from the lamp 8, illustrating how the metal stoppers are disposed in the backlight unit 112. For the sake of simplicity, FIG. 3 and FIG. 4 illustrate only the metal stoppers 11 (11A, 11B), the light guide plate 3, the lamp 8 and the lamp holders 10. FIGS. 5A–5E and FIGS. 6A–6E show the metal stoppers 11 used in the backlight unit 112.

Figure 5E:
FIG. 5A through 5E show a left-hand-side (LH) metal stopper in the backlight unit according to the first embodiment, in front view, left side view, plan view, right side view, and rear view respectively.
Figure 5B:
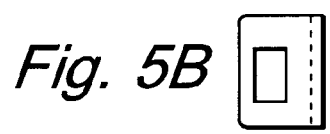
Figure 5C:
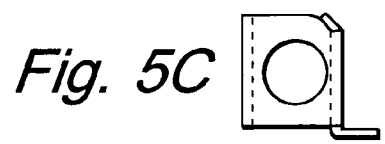
Figure 5D:
Figure 5A:

According to the present embodiment, the metal stoppers 11 include two members: a left-hand-side (LH) metal stopper 11A placed closely to the left side-surface of the light guide plate 3, and a right-hand-side (RH) metal stopper 11B placed closely to the right side-surface of the light guide plate 3. The LH metal stopper 11A is a metal member having a shape shown in FIGS. 5A–5E, and is made, for example, of a SUS-304 stainless steel plate having a thickness of 0.3 mm. It should be noted here, however, that the material and the thickness thereof may be varied as far as the variation can increase impact resistance to be described later, without sacrificing a desired narrowness of the frame required of the liquid crystal display device. Thus, the stopper according to the present invention represented by the metal stoppers 11A, 11B may be made of a material other than metal. FIGS. 5A–5E show the LH metal stopper 11A, in front view, left side view, plan view, right side view and rear view respectively. As shown in FIGS. 5B and 5C, the LH metal stopper 11A has a side surface having a rectangular hole, and an upper surface having a circular hole. These holes make engagement with the chassis 7. Specifically, as shown in FIG. 1, the holes are fitted to the frame-like chassis 7, closely to the left side of light guide plate 3. (When attached to the chassis 7, the upper surface of the LH metal stopper 11A faces away from the display surface.) As shown in FIG. 3 and FIG. 4, the LH metal stopper 11A includes a pawl 11Ap which comes between the lamp holder 10 and a left end of the light incident surface 3i in the light guide plate 3 when attached to the chassis 7.

Figure 6E:
FIG. 6A through 6E show a right-hand-side (RH) metal stopper in the backlight unit according to the first embodiment, in front view, left side view, plan view, right side view, and rear view respectively.
Figure 6B:
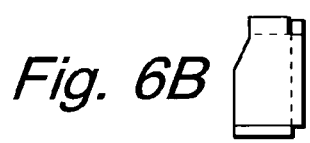
Figure 6C:
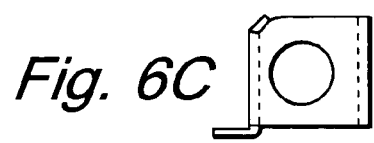
Figure 6D:
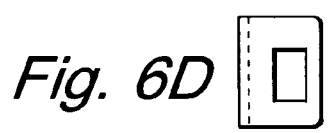
Figure 6A:
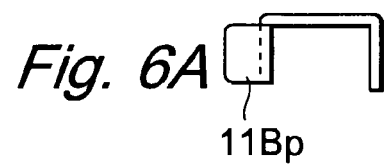

On the other hand, the RH metal stopper 11B is made of the same material as the LH metal stopper 11A, and has a shape shown in FIGS. 6A–6E. FIGS. 6A–6E show the RH metal stopper 11B in front view, left side view, plan view, right side view and rear view respectively. As shown in FIGS. 6D and 6C, the RH metal stopper 11B has a side surface having a rectangular hole, and an upper surface having a circular hole. These holes make engagement with the chassis 7. Specifically, as shown in FIG. 1, the holes are fitted to the frame-like chassis 7, closely to the right side of light guide plate 3. (When attached to the chassis 7, the upper surface of the RH metal stopper 11B faces away from the display surface.) As shown in FIGS. 3 and 4, the RH metal stopper 11B includes a pawl 11Bp which comes between the lamp holder 10 and a right end of the light incident surface 3i in the light guide plate 3 when attached to the chassis 7.

Thus, in the present embodiment, the metal stoppers 11A, 11B are fitted to the chassis 7, thereby being fixed to the chassis 7. Alternatively, however, or in addition to this, screws for example may be used to fix the metal stoppers 11A, 11B to the chassis 7. When screwing the metal stoppers 11A, 11B, the circular holes shown in FIGS. 5C and 6C are used as screw holes.

Figure 7:
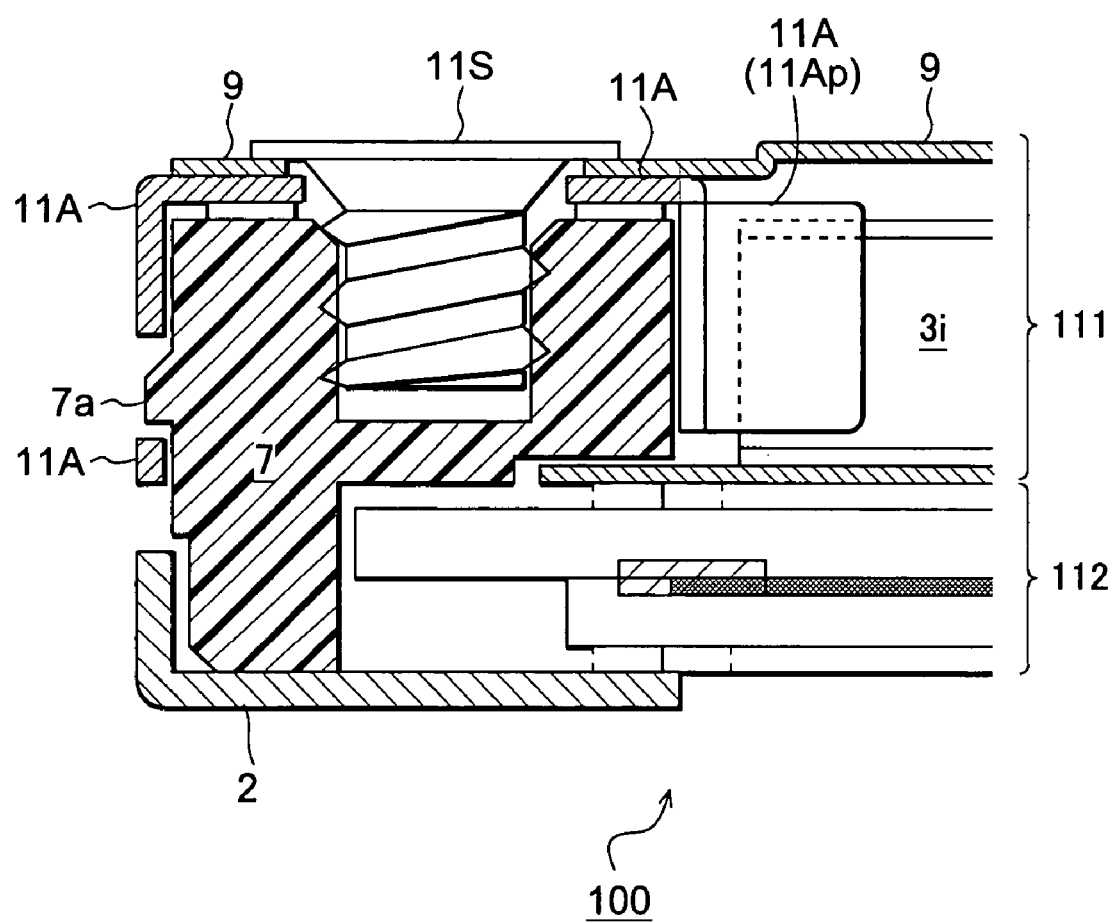
FIG. 7 is a fragmentary sectional view showing a metal stopper which is fitted and screwed into a chassis.
Figure 8E:
FIG. 8A through 8E show a left-hand-side (LH) metal stopper in a backlight unit according to a second embodiment of the present invention, in front view, left side view, plan view, right side view, and rear view respectively.
Figure 8B:
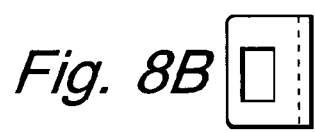
Figure 8C:
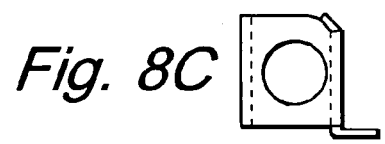
Figure 8D:
Figure 8A:
Figure 9E:
FIG. 9A through 9E show a right-hand-side (RH) metal stopper in a backlight unit according to the second embodiment of the present invention, in front view, left side view, plan view, right side view, and rear view respectively.
Figure 9B:
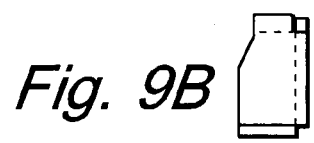
Figure 9C:
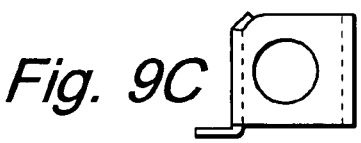
Figure 9D:
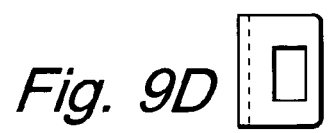
Figure 9A:
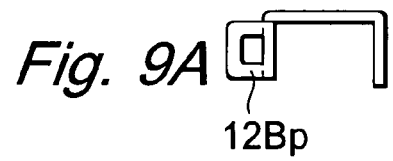

FIG. 7 shows an example in which fixation of a metal stoppers is achieved by fitting and screwing. FIG. 7 is a sectional view taken in lines VII—VII in FIG. 1, representing a section taken near the light incident surface 3i of the light guide plate 3 in the liquid crystal display module 100 according to the present embodiment. The section in FIG. 7 is a section perpendicular to the section shown in FIG. 2. In this example, the chassis 7 includes a side surface formed with a projection 7a at a predetermined place close to the light incident surface 3i of the light guide plate 3. The square hole of the metal stopper 11A is fitted around the projection 7a, and at the same time, a screw 11S comes through the circular hole of the metal stopper 11A and threads into the chassis 7, thereby fixing the metal stopper 11A to the chassis 7 and positioning the pawl 11Ap of the metal stopper 11A between the light incident surface 3i and the lamp holder 10.

It should be noted here that the metal stoppers 11A, 11B are removable toward the back (in the direction away from the display surface) according to the present embodiment, but the direction in which the metal stoppers 11A, 11B are removed is not limited by this embodiment, and may be in whichever directions including toward the front surface (toward the display surface).

1.2 Advantages

According to the embodiment, if an impact from outside tends to move the light guide plate 3 in the direction opposite to that of light incident on the light incident surface 3i, namely to move the light guide plate 3 toward the lamp 8, the pawls 11Ap, 11Bp of the metal stoppers 11A, 11B held by the frame-like chassis 7 make contact with the right and left ends of the light incident surface 3i of the light guide plate 3, thereby preventing the light guide plate 3 from being moved (See FIG. 3 and FIG. 4.) Since the metal stoppers 11A, 11B are relatively strong parts (made of stainless steel for example) provided separately from the chassis 7 and other components, the metal stoppers 1A, 11B can sufficiently prevent the light guide plate 3 from moving toward the lamp 8, thereby offering improved impact resistance for the liquid crystal display device (and the backlight unit 112 utilized therefor.)

For example, a 15-inch notebook PC liquid crystal module incorporating the present embodiment was compared to a conventional equivalent, i.e. a 15-inch notebook PC liquid crystal module which did not include the metal stoppers 11A, 11B, in an impact resistance test, and following results were found:

1. Impact resistance of the Conventional Example: 180 G, 2 m/sec

2. Impact resistance of the present invention: 250 G, 2 m/sec The values given above represent maximum impact that did not damage the lamp 8 or other components. The test was made using a Shock Test Machine manufactured by Lansmont Corporation in U.S, with the liquid crystal module specimens being in the non-active state. The acceleration given to the specimens was a sine curve acceleration exerted toward the lamp 8. As has been proven by the test, the present embodiment remarkably improves the impact resistance of the backlight unit which incorporates a prism light guide plate, and thus improves the impact resistance of the liquid crystal module using the backlight unit.

It should be noted here that if stoppers (the stopping means) are provided by extensions from e.g. a frame-like supporting member as in Conventional Example 1, it is difficult to render the stoppers with sufficient strength without sacrificing a desirable narrowness in the frame of the display unit. On the contrary, according to the present embodiment, the metal stoppers 11A, 11B are separate members from the chassis 7 and other members, and therefore can be made of any material which can provide sufficient strength within a given range of thinness. Thus, it becomes possible to improve the impact resistance without sacrificing a desirable narrowness in the frame of the display unit.

Further, if the stoppers are separate members as in the present embodiment, the stoppers can be used commonly in many different liquid crystal display modules. This can improve the impact resistance while avoiding unacceptable cost increase in the addition of the stoppers as well as improving operability in assembling process.

Further, according to the present embodiment, when the prism light guide plate 3 is inserted into the lamp reflector 9 during the assembly of the backlight unit 112, the light incident surface 3$i$ of the prism light guide plate 3 makes contact with the pawls 11Ap, 11Bp of the metal stoppers 11A, 11B, making it easy to position the part and thereby improving operating efficiency (productivity) in the assembling process. This also improves positioning accuracy of the prism light guide plate 3, which leads to improved uniformity in the quality of display due to improved uniformity in the lighting provided by the backlight unit 112.

Still further, according to the present embodiment, the stoppers 11A, 11B are attached to the frame-like supporting member or the chassis 7, and their pawls 11Ap, 11Bp extend inward from sides, preventing the light guide plate 3 from moving toward the lamp 8. Therefore, use of the stainless steel lamp reflector 9 or a similar rigid lamp reflector for improved optical efficiency does not decrease operability when attaching the lamp 8.

2. Second Embodiment

Next, description will cover a liquid crystal display device according to a second embodiment. Here again, the liquid crystal display device according to the present embodiment is used as a liquid crystal display module in a notebook PC for example, and includes a backlight unit serving as a surface lighting device. Further, the second embodiment is essentially the same as the first embodiment, except for the stoppers used in the backlight unit (See FIG. 1 through FIG. 4). Hereinafter, elements of the present embodiment which are identical with those used in the first embodiment will be identified by the same reference numerals, and their detailed description will not be repeated so that a focus will be kept on essential features of the stoppers according to the present embodiment.

Figure 10:
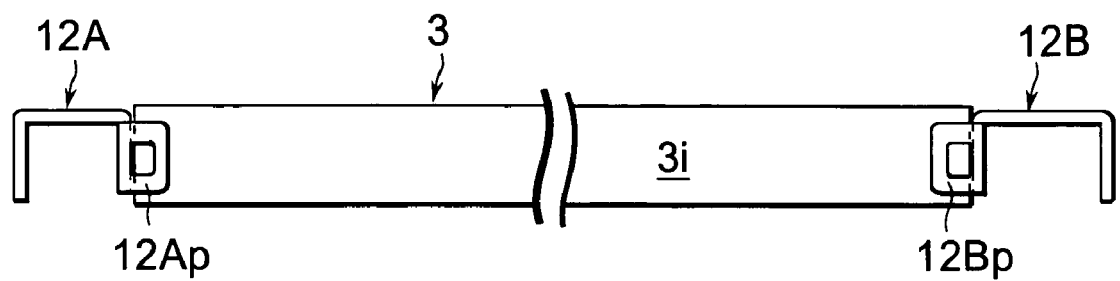
FIG. 10 is a front view (or a side view from a lamp) for describing where metal stoppers are attached in the backlight unit according to the second embodiment.

In the present embodiment, again, the metal stoppers include two members: a left-hand-side (LH) metal stopper 12A placed closely to the left side-surface of the prism light guide plate 3, and a right-hand-side (RH) metal stopper 12B placed closely to the right side-surface of the light guide plate 3, and both are made of the same material as in the first embodiment. Differences, however, lies in the shape: the metal stoppers 12A, 12B according to the present embodiment are slightly different from the counterparts in the first embodiment. More specifically, in the present embodiment, the LH metal stopper 12A has a shape shown in FIGS. 8A–8E, and the RH metal stopper 12B has a shape shown in FIGS. 9A–9E. Like the first embodiment, these metal stoppers 12A, 12B fit to and thereby attach to the frame-like chassis 7, closely to a left-hand side and a right-hand side respectively of the light guide plate 3. As shown in FIG. 10, these metal stoppers 12A, 12B include pawls 12Ap, 12Bp respectively. When attached to the chassis 7, these pawls 12Ap, 12Bp come between respective pairs of the lamp holder 10 and the left or the right end of the light incident surface 3$i$ in the light guide plate 3. In the present embodiment, each of these pawls 12Ap, 12Bp is formed with a through hole, and differing from the first embodiment, part of light from the lamp 8 passes through these through holes and enters the light guide plate 3.

Figure 11:
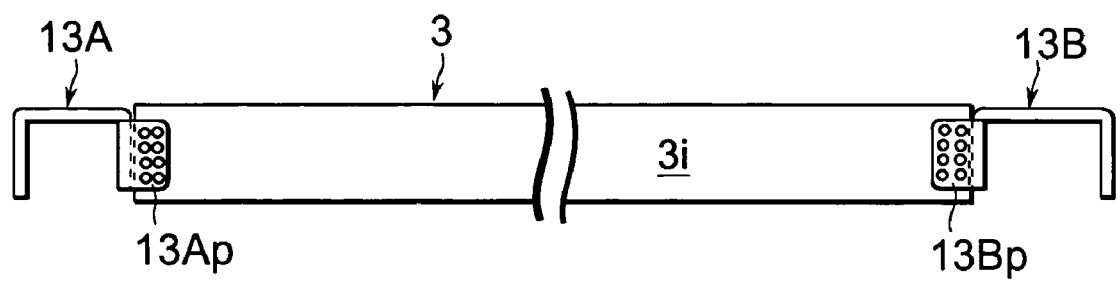
FIG. 11 is a front view (or a side view from a lamp) for describing where metal stoppers are attached in the backlight unit according to a variation of the second embodiment.

The metal stoppers 12A, 12B each have a rectangular through hole. However, the shape and the number of the through holes are not limited by this as far as the through holes contribute to improved efficiency in the use of light from the lamp 8. FIG. 11 shows one of such variations: Metal stoppers 13A, 13B have respective pawls 13Ap, 13Bp, each provided with a plurality of small round holes.

The present embodiment provides the same advantages as offered by the first embodiment, with improved efficiency in the use of light from the lamp 8 over the first embodiment. Specifically, at each end of the lamp 8 is a transparent lamp holder 10, and so the use of the metal stoppers 11A, 11B according to the first embodiment can cause insufficient supply of light from the electrode portions of the lamp 8 to the light guide plate 3, resulting in decreased quality of display. However, according to the present embodiment, light from the end portions of lamp 8 passes through the lamp holders 10 and the through holes of the pawls 12Ap, 12Bp, entering from the light incident surface 3$i$ into the light guide plate 3. This improves efficiency in the use of light at the electrode portion of lamp 8, leading to high quality display.

3. Variations 3.1 First Variation

The first and the second embodiments use two kinds of metal stoppers or the LH metal stopper and the RH metal stopper. Alternatively, only one kind of metal stopper may serve both, i.e. one on the left side and another on the right side. An example is shown in FIGS. 12A–12E, where a metal stopper 14 has two pawls 14$ap$, 14$bp$, and a couple of the metal stoppers 14 is used. FIGS. 12A–12E show the metal stopper 14, in front view, left side view, plan view, right side view and rear view respectively. When using such a stopper as the metal stopper 14 in a pair, one of them serves as a LH stopper at a position near a left end of the light incident surface 3$i$ in the prism light guide plate 3, with the pawl 14$ap$ faced to the left end of the light incident surface 3$i$. On the other hand, the other of the pair serves as a RH stopper at a position near a right end of the light incident surface 3$i$ in the prism light guide plate 3, with the pawl 14$bp$ faced to the right end of the light incident surface 3$i$. An arrangement such as the above can also provide the same advantages as provided by the embodiments described earlier. Further, since this variation uses only one kind of the stopper, cost of adding the stoppers is reduced and operability in assembling process is improved. Further, by using this stopper commonly in many different liquid crystal display modules, the above advantages can be further increased.

3.2 Second Variation

Alternatively to the metal stoppers 11–14 according to the first and the second embodiments and the first variation, metal stoppers may have two pawls; a first pawl like the one in the first embodiment, and a second pawl perpendicular to the first pawl. In the present variation, metal stoppers 15 include two members: a left-hand-side (LH) metal stopper 15A placed closely to the left side-surface of the light guide plate 3, and a right-hand-side (RH) metal stopper 15B placed closely to the right side-surface of the light guide plate 3. The LH metal stopper 15A has a shape shown in FIGS. 13A–13E, whereas the RH metal stopper 15B has a shape shown in FIGS. 14A–14E. (Both LH and RH stoppers are made of the same material and in the same thickness as in the first embodiment.) FIGS. 13A–13E show the LH metal stopper 15A in front view, left side view, plan view, right side view and rear view respectively, whereas FIGS. 13A–13E show the RH metal stopper 15B in front view, left side view, plan view, right side view and rear view respectively. According to the present variation, the LH metal stopper 15A has a pawl 15Ap which is the same as in the first embodiment, plus a second pawl 15Aq which is perpendicular to the pawl 15Ap. Likewise, the RH metal stopper 15B has a pawl 15Bp which is the same as in the first embodiment, plus a second pawl 15Bq which is perpendicular to the pawl 15Bp. According to the present variation, the metal stoppers 15A, 15B are the same as the metal stoppers 11A, 11B according to the first embodiment, except that they have the second pawls 15Aq, 15Bq.

The LH metal stopper 15A and the RH metal stopper 15B according to the present variation are attached to the chassis 7 in the same way as in the first embodiment (See FIG. 1–FIG. 4). As attached in this way, the first pawls 15Ap, 15Bp serve as inward extensions from sides, near ends of the light incident surface 3i in the light guide plate 3. On the other hand, the second pawls 15Aq, 15Bq serve as inward extensions from sides, near ends of other two side surfaces which are adjacent to the light incident surface 3i in the light guide plate 3. (Since these two portions make a shape of L, the metal stoppers 15A, 15B shown in FIGS. 13A–13E and FIGS. 14A–14B will be called "L-shaped metal stoppers" whereas the metal stoppers 11A, 11B shown in FIGS. 5A–5E and FIGS. 6A–6B will be called "normal metal stoppers" hereinafter.) The L-shaped metal stoppers 15 represent the stopper according to the present invention for preventing the light guide plate 3 from moving in two directions, and are fixed by fitting, screwing or other methods to near a corner of the main surface in the light guide plate 3. If the light source is L-shaped as will be described later (See FIGS. 15A–15I and FIGS. 16A–16I), the light source can be better protected from damage caused by impact from outside, by using the L-shaped metal stoppers 15 serving as the stopper for preventing the light guide plate 3 from moving.

3.3 Third Variation

According to the first and the second embodiment, metal stoppers are made of a material and in a thickness sufficient to improve the impact resistance described earlier. (For example, the metal stoppers are made of a SUS-304 stainless steel plate having a thickness of 0.3 mm.) Alternatively, the metal stoppers may be made of a shape-memory alloy having an equivalent strength, such as a Ni—Ti shape-memory alloy (a predetermined type of titanium-nickel alloy). If such metal stoppers are used in a backlight unit or other surface lighting devices, the surface lighting device (or a liquid crystal display device incorporating such a surface lighting device) can restore an original level of impact resistance when the metal stoppers, which are made of a shape-memory alloy, are heated back to its original shape after receiving impact from outside for a plurality of times.

3.4 Fourth Variation

The metal stoppers which serve as the stopping means in the surface lighting device according to the present invention satisfies the conditions described above with respect to strength. In addition, the metal stoppers are preferably provided by a member or made of a material having a highly reflective surface, or more specifically a surface having a reflectance not smaller than 70%. Such a metal stopper reflects incident light on the surface of the metal stopper at a high rate of reflection, i.e. at a reduced rate of light absorption by the metal stoppers, enabling more efficient use of light from the light source. More preferably, the metal stoppers have a reflectance not smaller than 80% on the surface facing the light guide plate 3. Such a high rate can be achieved by a surface finish with silver coating for example. Generally, the light source of a backlight unit for a liquid crystal display device is provided by a cold cathode tube. The light from two ends of the tube has a lower brightness than the light from the middle. As a result, corner areas of the backlight unit main surface (i.e. the main surface of the light guide plate 3) sometimes look darker. The above metal stoppers which have a high reflectance on their surfaces facing the light guide plate 3 enable more efficient use of light in the backlight unit while improving on the problem of dark corners in the backlight unit main surface.

3.5 Other Variations

The surface lighting device according to the present invention includes a light guide member, which is typically a plate, i.e. a light guideplate as in the first and the second embodiments. However, the present invention is not limited by the shape of light guide member. Specifically, the light guide member may be of whatever shape as far as it has a side surface and a main surface, and capable of serving as a surface lighting device by allowing light to enter from a side surface and come out from the main surface. For example, a light guide member may have two triangular side surfaces adjacent to a surface facing the light source: In this case, the light guide member has a decreasing thickness as distance increases from the light source.

According to the first and the second embodiments, a linear light source (a straight tube) is used as a light source for the backlight unit 112. However, the shape of the light source is not limited to linear, or the number of light source is not limited to one, either. For example, a brighter light source can be achieved by using a U-shaped cold cathode tube which uses a U-shaped tube serving as a curvy discharge path. As another example, a brighter backlight unit can also be achieved by increasing the number of light incident surfaces and using an L-shaped cold cathode tube which uses an L-shaped tube serving as a discharge path. The use of such a U-shaped light source or an L-shaped light source enables to increase the brightness of backlight without increasing the number of light sources (lamps) and therefore without increasing the number of driving circuit such as additional inverter circuits for the additional lamps, making it possible to provide a bright backlight unit at low cost.

Figure 15A:
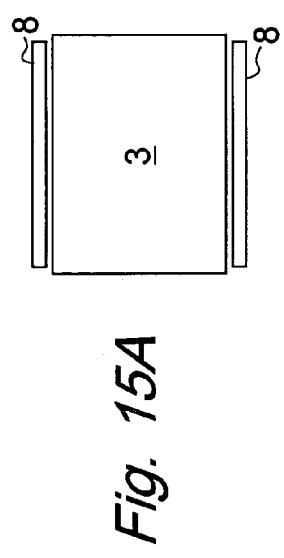
FIG. 15A through 15I are plan-view illustrations of a variety of backlight units having different numbers and shapes of light sources, showing how the light sources may be disposed in each.
Figure 15B:
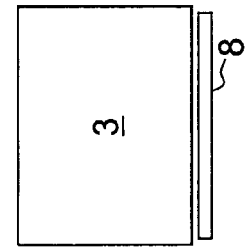
Figure 15C:
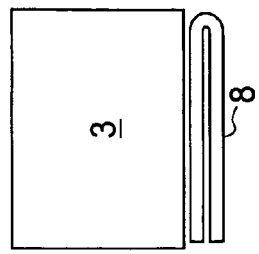
Figure 15D:
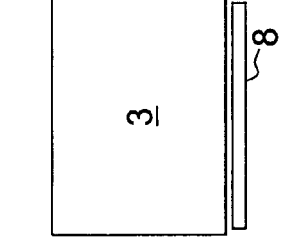
Figure 15E:
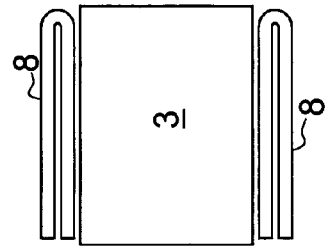
Figure 15F:
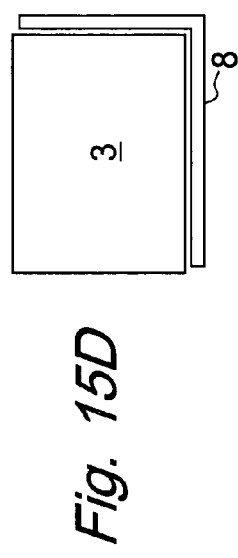
Figure 15G:
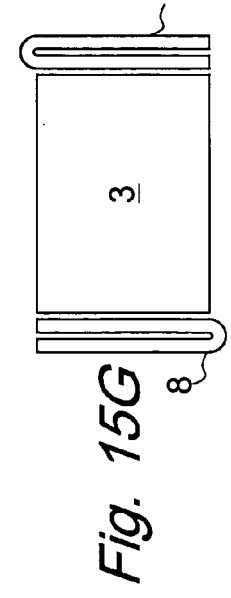
Figure 15H:
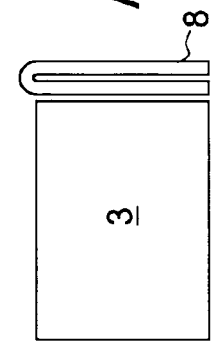
Figure 15I:
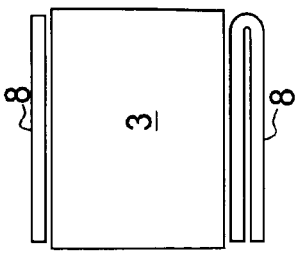

FIG. 15A through FIG. 15I are plan-view sketches of a variety of backlight units having different numbers and shapes of light sources, showing how the light sources may be disposed in each. FIG. 15A shows an example in which the light guide plate 3 has two mutually opposing side surfaces each backed by a straight light source 8. FIG. 15B shows an example in which the light guide plate 3 has a side surface faced by a straight light source 8. FIG. 15C shows an example in which the light guide plate 3 has two mutually adjacent side surfaces faced by an L-shaped light source 8, and two other mutually adjacent side surfaces faced by another L-shaped light source 8. FIG. 15D shows an example in which the light guide plate 3 has two mutually adjacent side surfaces faced by an L-shaped light source 8. FIGS. 15E and 15G show examples in which the light guide plate 3 has two mutually opposing side surfaces each backed by a U-shaped light source 8. FIGS. 15F and 15H show examples in which the light guide plate 3 has a side surface faced by a U-shaped light source 8. FIG. 15I shows an example in which the light guide plate 3 has two mutually opposing side surfaces, one backed by a U-shaped light source 8 and the other backed by a straight light source 8.

Figure 17A:
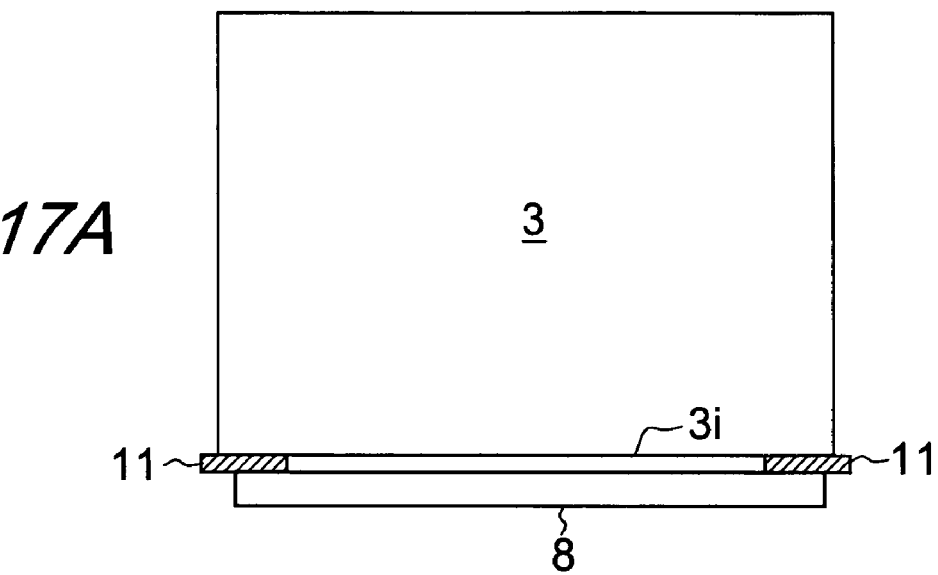
FIGS. 17A and 17B are a plan view and a front view showing how a light source is disposed with respect to a light guide plate when the light source is U-shaped.
Figure 17B:
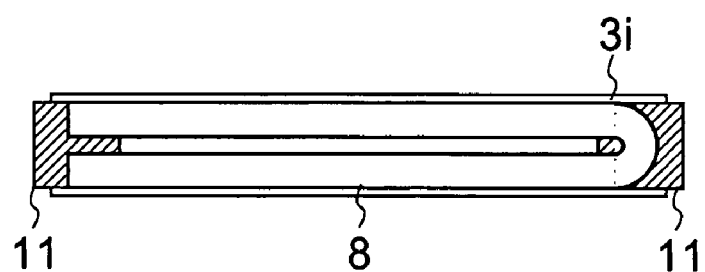

It should be noted here that when using a U-shaped light source, the U-shaped light source is placed in a specific relationship with the light guide plate 3 in order for the entire light source to be as close as possible to the light incident surface 3i of the light guide plate 3. Specifically, the relationship is not as shown in FIGS. 15E, 15F or others, but as shown in FIGS. 17A and 17B. FIG. 17A is a plan view showing how a U-shaped light source 8 should be disposed with respect to a light guide plate 3, whereas FIG. 17B is a front view (side view) showing the same relationship. As understood, use of a U-shaped light source will result in an increased thickness of the light guide plate 3 (i.e. a dimension perpendicular to the main surface) and thus an increased mass of the light guide plate 3 as compared to cases where use is made for a straight or an L-shaped light source. Accordingly, the metal stoppers will be given sufficient sizes and strength for the given thickness and the mass. When using an L-shaped light source, two mutually adjacent side surfaces of a light guide plate 3 are faced by the L-shaped light source, which means both of the side surfaces are light incident surfaces. Accordingly, both side surfaces must be prevented from contacting the light source. Thus, in order to prevent the light guide plate 3 from moving any of the two directions (i.e. a direction for one of the side surfaces to hit the light source, and another direction for the other of the side surfaces to hit the light source), the L-shaped light source is stopped by (often a plurality of) stopping means, using normal metal stoppers and/or L-shaped metal stoppers.

According to the first and the second embodiment, a LH metal stopper and a RH metal stopper are provided near the left and the right ends respectively of a light incident surface 3i which is the surface of a light guide plate 3 that faces a light source. Alternatively, in order to reduce the number of parts, only one metal stopper may be provided near either end of the light incident surface 3i. Further, when a single backlight unit uses a plurality of metal stoppers as the stopping means for preventing the light guide plate 3 from moving, these metal stoppers may be different kinds from each other: For example, a normal metal stoppers 11 (11A) in FIGS. 5A–5E and an L-shaped metal stopper 15 (15A) in FIGS. 13A–13E may be used together.

FIG. 16A through FIG. 16I are plan-view illustrations of a variety of backlight units having different numbers and shapes of light sources, showing how metal stoppers may be disposed in each. Each of FIGS. 16A, 16E and 16G shows a case in which a total of four normal metal stoppers 11 are used for a total of two light incident surfaces of a light guide plate 3, i.e. two metal stoppers 11 per light incident surface. Each of FIGS. 16B and 16H shows a case in which two normal metal stoppers 11 are used for a light incident surface of a light guide plate 3. FIG. 16C shows a case in which two L-shaped metal stoppers 15 are used for four light incident surfaces of a light guide plate 3. FIG. 16D shows a case in which one L-shaped metal stopper 15 and one normal metal stopper 11 are used for two light incident surfaces of a light guide plate 3. FIG. 16F shows a case in which one normal metal stopper 11 is used for one light incident surface of a light guide plate 3. FIG. 16I shows a case in which two normal metal stoppers 11 are used for one of two light incident surfaces of a light guide plate 3 whereas one normal metal stoppers 11 is used for the other.

It should be noted here that when an normal metal stopper 11 is provided by the one shown in FIGS. 5A–5E and in FIGS. 6A–6E, and an L-shaped metal stoppers 15 is provided by the one shown in FIGS. 13A–13E and in FIGS. 14A–14E, side surfaces of the light guide plate 3 that are not faced by the light source 8 are respectively faced by predetermined portions of the frame-like chassis (See FIG. 1.), and the metal stoppers 11, 15 are fitted or screwed respectively to these predetermined portions though this is not shown in FIG. 16A–16I. However, as shown in FIG. 16C, i.e. when all of the four side surfaces of the light guide plate 3 are faced by light sources 8, the chassis is made to have such predetermined portions near the corners of the main surface in the light guide plate 3, for the fixation of the metal stoppers.

According to the first and the second embodiments, the stopper for preventing the light guide plate 3 from moving is provided by the normal metal stoppers 11 shown in FIGS. 5A–5E and FIGS. 6A–6E, or by the L-shaped metal stoppers 15 shown in FIGS. 13A–13E and FIGS. 14A–14E. However, the normal and the L-shaped metal stoppers 11, 15 may have other structures than those shown in these drawings.

Specifically, the normal metal stoppers 11 serving as the stopper according to the present invention may be of any structure as far as the structure can be held on the chassis 7 so that the structure is fixed near one of the two ends of the light incident surface 3i, for preventing the light guide plate 3 from moving in a direction that would move a specific side surface or the light incident surface 3i of the light guide plate 3 toward the light source, and as far as the structure includes a portion (i.e. an equivalent to the pawl 11Ap or 11Bp) which serves as an inward extension extending from a side of the light incident surface 3i when the structure is fixed to the place.

Likewise, the L-shaped metal stoppers 15 serving as the stopper according to the present invention may be of any structure as far as the structure can be held on the chassis 7 so that the structure is fixed near a corner of the light guide plate main surface closely to a border of two mutually adjacent side surfaces or the two light incident surfaces 3i, for preventing the light guide plate 3 from moving in any of two directions that would move one of the two side surfaces or the light incident surfaces 3i of the light guide plate 3 toward the respective light source, and as far as the structure includes an L-shaped portion including a first portion (i.e. an equivalent to the pawl 15Ap or 15Bp) which serves as an inward extension extending from a side of one of the side surfaces when the structure is fixed to the place, and a second portion (i.e. an equivalent to the pawl 15Aq or 15Bq) which serves as an inward extension extending from a side of the other side surface when the structure is fixed to the place. According to such L-shaped metal stoppers, a light guide plate 3 is prevented from moving in whichever of the two directions, i.e. whichever of the two mutually adjacent surfaces or the light incident surfaces 3i of the light guide plate 3 is prevented from moving toward the respective light source, by a single L-shaped metal stopper. Therefore, the L-shaped metal stoppers offer an advantage of improved impact resistance without increasing the number of parts, in a surface lighting device such as a backlight unit which includes a light guide plate 3 having two mutually adjacent light incident surfaces.

Further, according to the first and the second embodiments, the backlight unit 112 uses an edge light provided by a cold cathode tube, as a light source. Alternatively however, the light source may be provided whatever else as far as the layout is a sidelight type, i.e. as far as the light enters from a side surface 3i of the light guide plate 3. In other words, the present invention does not limit the light source to an edge light provided by a cold cathode tube. For example, the light source may be provided by a xenon lamp, a hot cathode tube, or an LED (Light Emitting Diode).

Thus far, description has been made for surface lighting devices that serve as a backlight unit for liquid crystal display devices. However, the surface lighting device according to the present invention is not only applicable to a backlight unit for liquid crystal display device but also applicable to a front-light unit for example.

While the invention has been described in detail, the foregoing description is in all aspects illustrative and not restrictive. It is understood that numerous other modifications and variations can be devised without departing from the scope of the invention.

What is claimed is:

1. A surface lighting device comprising:
   a light guide member having a first side surface for light to enter, and a main surface for light to exit;
   a light source facing the first side surface of the light guide member;
   a holder for holding the light guide member; and
   a stopper mounted on the holder near the first side surface, for preventing the light guide member from moving toward the light source;
   wherein the stopper is a separate member having a first portion overlaying a portion of the holder and a projecting portion, not parallel to said first portion, and projecting from said first portion along the first side surface of the light guide member.

2. The surface lighting device according to claim 1, wherein the light source is linear.

3. The surface lighting device according to claim 1, wherein
   the light guide member includes a second side surface for light to enter adjacent the first side surface and
   the light source is L-shaped, and facing the first and second side surfaces of the light guide member,
   the stopper preventing the light guide member from moving toward the light source and preventing the first and second side surfaces from contacting the light source.

4. The surface lighting device according to claim 1, wherein the light source is U-shaped.

5. The surface lighting device according to claim 1, wherein
   the light source includes a first and a second light sources,
   the stopper preventing the light guide member from moving toward the first light source and toward the second light source.

6. The surface lighting device according to claim 5, wherein at least one of the first and the second light sources is linear.

7. The surface lighting device according to claim 5, wherein the light guide member includes a second side surface for light to enter adjacent the first side surface and at least one of the first and the second light sources is L-shaped, facing the first and second side surfaces of the light guide member,
   the stopper preventing the light guide member from moving toward the L-shaped light source and preventing the first and second side surfaces from contacting the L-shaped light source.

8. The surface lighting device according to claim 5, wherein at least one of the first and the second light sources is U-shaped.

9. The surface lighting device according to claim 1, wherein the stopper is made of a material having strength to enable the prevention of the light guide member from moving toward the light source at least to such an extent that the surface lighting device is improved in impact resistance by the stopper.

10. The surface lighting device according to claim 9, wherein the stopper is made of a metal.

11. The surface lighting device according to claim 10, wherein the stopper is made of a shape-memory alloy.

12. The surface lighting device according to claim 1, wherein the stopper includes a surface having a reflectance not smaller than 70%.

13. The surface lighting device according to claim 12, wherein the stopper includes a surface having a reflectance not smaller than 80% and facing the light guide member.

14. The surface lighting device according to claim 1, wherein the stopper is attached to the holder close to an end of the first side surface, and the projecting portion contacts the first side surface at a time of preventing the light guide member from moving toward the light source.

15. The surface lighting device according to claim 14, wherein the stopper is provided near only one of two ends of the light incident surface.

16. A surface lighting device comprising:
    a light guide member having a first side surface for light to enter, and a main surface for light to exit;
    a light source facing the first side surface of the light guide member;
    a holder for holding the light guide member; and
    a stopper near the first side surface, for preventing the light guide member from moving toward the light source;
    wherein the stopper is a separate member attached to the holder and includes a portion for contacting the first side surface at a time of preventing the light guide member from moving toward the light source, the portion including a through hole.

17. A surface lighting device comprising:
    a light guide member having a first side surface for light to enter, and a main surface for light to exit;
    a light source facing the first side surface of the light guide member;
    a holder for holding the light guide member; and
    a stopper near the first side surface, for preventing the light guide member from moving toward the light source; wherein
    the stopper is a separate member attached to the holder,
    the light guide member includes a second side surface for light to enter adjacent the first side surface,
    the stopper includes an L-shaped portion having a first and a second sub-portions which are mutually perpendicular to each other, for the first and second side surfaces of the light guide member,
    the first sub-portion extending inward from a side of one of the first and second side surfaces, for contacting said one of the first and second side surfaces at a time of preventing the light guide member from moving in a direction that allows said one of the first and second side surfaces to move toward the light source, and the second sub-portion extending inward from a side of the other of the first and second side surfaces, for contacting said other of the first and second side surfaces at a time of preventing the light guide member from moving in a direction that allows said other of the first and second side surfaces to move toward the light source.

18. A liquid crystal display device including lighting means for illuminating a liquid crystal panel, wherein the lighting means is provided by the surface lighting device according to claim 1.

19. The surface lighting device of claim 1 wherein said stopper comprises a body portion having a U-shaped cross section comprising first and second legs, said first leg comprising said first portion.

20. A surface lighting device comprising:

a light guide member having a first side surface for light to enter, a second side surface adjacent to said first side surface and a main surface perpendicular to said first and second side surfaces for light to exit;

a light source facing the first side surface of the light guide member;

a holder comprising a first material for holding the light guide member; and a stopper mounted on the holder for limiting movement of said light guide member toward said light source and comprising a body formed of a second material different from said first material, said body including a first portion between said holder and said second side surface and a second portion projecting along said first side surface.

* * * * *